UNITED STATES PATENT OFFICE 2,119,131

METHOD OF PREPARING DITHIAZYL DISULPHIDES

Albert J. Gracia, Cuyahoga Falls, Ohio, assignor to Wingfoot Corporation, Wilmington, Del., a corporation of Delaware No Drawing. Application April 16, 1937, Serial No. 137,369

8 Claims. (Cl. 260—16)

This invention relates to an improved method of preparing dithiazyl disulphides and, more particularly, to improvements in the method of oxidizing 1-mercapto thiazoles to the corresponding dithiazyl disulphides.

In the preparation of dithiazyl disulphides, some of which are widely used as accelerators for the vulcanization of rubber, from the corresponding 1-mercaptothiazoles, a hydrogen atom is split off from the sulfhydryl group of each of two molecules of the corresponding mercapto compound by means of an oxidizing agent and the two molecules unite to form the disulphide. Various methods of oxidizing the mercapto compound have been proposed and used, among them a method employing hydrogen peroxide, the reaction proceeding as follows when 1-mercaptobenzothiazole is oxidized:

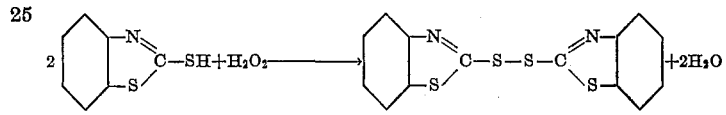

This method is subject to the disadvantage that the peroxide is a comparatively expensive oxidizing agent and attempts have been made to replace it by a less expensive oxidant.

Accordingly, it has been proposed to use a combination of sodium nitrite and air for this purpose, utilizing atmospheric oxygen to regenerate the nitrogen oxides which are produced from the nitrous acid and which are believed to be the actual oxidant. It has been observed, however, that the oxidation of the mercapto thiazole proceeds very slowly, and may be incomplete, when less than the molecular equivalent of nitrite is present and it is attempted to make up the deficiency of oxidizing agent by blowing in air.

On the other hand, it has now been found that the use of a nitrite as the sole oxidizing agent, in an amount at least molecularly equivalent to the mercaptothiazole to be oxidized, greatly speeds up the reaction, which proceeds smoothly to completion in a short time. The product is obtained in nearly 100% yield and of excellent purity and color. No air is added during the oxidation but, rather, an equivalent of a nitrite is relied upon to complete the oxidation in accordance with the equation

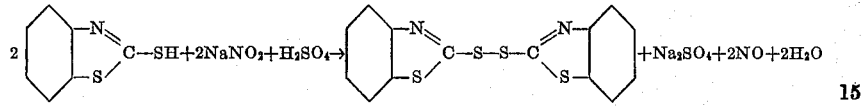

In order to determine the efficiency of the new process as compared with that employing a combination of nitrite and air, runs were made for the conversion of mercaptobenzothiazole to di-(benzothiazyl) disulphide, employing a 100% equivalent of sodium nitrite as the oxidizing agent and employing 40% and 5%, respectively, of the theoretical equivalent of sodium nitrite, while blowing in air to make up the deficiency of oxidizing agent. A dilute mineral acid, such as sulphuric acid, is added slowly in all of the runs to release the nitrous acid from its salt. The runs were made both at about room temperature and at a temperature near the boiling point of water, these temperatures representing the practically available extremes in plant operation. The following tabulation shows the results obtained, the significance of the melting point of the final product being clear when it is taken into account that the melting points of 1-mercaptobenzothiazole and of di(benzothiazyl) disulphide are very nearly the same, about 179° C.

| Run | Batch | Temp. °C. | Time Hours | Air | Color | Melting point °C. |
|---|---|---|---|---|---|---|
| 1 | 100% NaNO₂ | 30 | 1¼ | No | Light peach | 166–168 |
| 2 | 100% NaNO₂ | 95 | ¾ | No | do | 165–167 |
| 3 | 40% NaNO₂ | 30 | 7 | Yes | do | 168–173 |
| 4 | 40% NaNO₂ | 95 | 2½ | Yes | Yellow | 138–155 |
| 5 | 5% NaNO₂ | 95 | 3 | Yes | do | 170–173 (MBT) |

The foregoing tabulation shows very plainly that a much shorter time is required to complete the conversion where sodium nitrite is used as the sole oxidizing agent than where it is attempted to replace 60% or more of the nitrite by air. Indeed, these figures show that a method involving the blowing of air into the reaction mass is impractical at temperatures as high as 95° C., run 4, employing 40% of the nitrite theoretically necessary, yielding a product which was yellow in color and had a melting point ranging from 138° to 155° C. In view of the fact that the melting points of the starting material and of the desired product are approximately the same, about 179° C., this low melting point indicates a mixture and shows that all of the mercaptobenzothiazole had not been converted when the nitrite present was exhausted. Run 5, employing only 5% of sodium nitrite, with air as the secondary oxidizing agent, was completely unsuccessful, analysis showing that the final product was largely unconverted mercaptobenzothiazole (MBT).

The only successful run with less than the equivalent amount of nitrite was run 3 and here, as will be observed, the total elapsed time to completion of the reaction was 7 hours at 30° C., as compared with 1¼ hours at the same temperature when 100% of sodium nitrite was used. In other words, the attempt to displace a portion of the nitrite by air caused the reaction to take between five and six times as long to go to completion. Actually, the discrepancy is even greater since, where the full molecular equivalent of sodium nitrite is used, the reaction time can be cut to ¾ hour by raising the temperature to 95° C., and still obtain an acceptable product (run 2), whereas, raising the temperature to 95° when employing less than the theoretical amount of nitrite, as in run 4, resulted in a product of low melting point which contained large amounts of unconverted starting material.

In conducting the improved process, the following procedure may be employed:

*Example 1*

An aqueous solution of a soluble salt of mercaptobenzothiazole, e. g. sodium mercaptobenzothiazole, is run into dilute sulphuric acid made up from 300 gallons of city water and 81 pounds of 95% $H_2SO_4$. The sodium salt is run in and the mixture agitated until a neutral or slightly acid (to litmus) test is obtained, about 250 pounds of the sodium salt being required. This procedure results in a slurry of the precipitated free mercaptan to which is added the chemical equivalent of solid sodium nitrite, and, preferably, a 5% excess. About 110 pounds of $NaNO_2$ are needed to provide this excess. The slurry, containing the nitrite, is heated to 90–95° C. in a tank and a 5–10% solution of sulphuric acid is run in at a rate sufficient to cause the foam formed to rise within 3 or 4 inches of the top of the tank and to cause a small amount of brown fumes ($NO_2$) to appear in the vapors rising from the slurry. The sulphuric acid liberates the nitrous acid from the sodium nitrite and the appearance of the brown fumes of $NO_2$ indicates when the acid is being added just fast enough to liberate the nitrous acid at the same rate as it is being used up to oxidize the mercaptan to the disulphide. Agitation is maintained throughout the oxidation period. The amount of sulphuric acid added to liberate the nitrous acid may amount to some 10% in excess of the theoretical quantity, based on the mercaptobenzothiazole present, and, consequently, the reaction medium during oxidation will be slightly acid.

It will be apparent, then, that the present process, employing a nitrite as the sole oxidizing agent, is cheaper and more satisfactory than a process in which it is attempted to replace part of the nitrite by atmospheric oxygen. While some saving in the cost of oxidant may be effected by blowing in air, this is more than compensated for by the very much shorter reaction period which reduces the cost of operation and permits greater production from the same investment and equipment. As previously mentioned, the present process can be operated at higher temperatures to cut down the reaction time and thus effect a further saving over that possible when employing room temperature, while the nitrite-air process cannot be employed at these higher temperatures because oxidation is not complete and the product is impure. Apparently the hot reaction mass does not dissolve the air sufficiently to effect complete oxidation before the nitrite present is used up, the oxygen of the air being available only when nitrous acid or nitrogen oxides are present to act as a carrier, in accordance with the equation $$NO_2 \rightleftharpoons NO + O$$

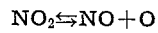

That this is the difficulty with the prior process is indicated by the results obtained in run 5 above where only 5% of the theoretically equivalent nitrite was employed and this was evidently consumed by the reaction or the nitrogen oxides formed were carried away in the air stream before any appreciable amount of product was formed.

While a dilute mineral acid, such as sulphuric acid, is referred to above as the source of acid for decomposing the alkali metal nitrite used, it has been found that the process can be further improved by replacing this mineral acid with alkali metal bisulphate. Use of sodium bisulphate results in a still greater efficiency of the oxidizing agent since it is not necessary to control as carefully the addition of the acid-yielding substance. That is to say, while the sulphuric acid is added gradually and the supply is controlled so that brown fumes of nitric oxide barely appear above the reaction mass, thus indicating decomposition of the nitrite to nitrous acid and nitrogen oxides, the alkali metal bisulphate, such as sodium bisulphate, can be added much faster to the batch containing the mercaptothiazole and the nitrite. This is possible because the bisulphate acts as a buffer and breaks down to supply acid only as fast as such acid is consumed by the reaction. Accordingly, there is never any excess of nitrous acid or nitrogen oxides present to escape before they have been used in oxidizing an equivalent quantity of the mercaptothiazole. This is made plainly apparent in plant operation since the head of foam in the reaction vessel is much more stable when the bisulphate is used in place of sulphuric acid, fluctuations in this head of foam indicating irregular generation of nitrous acid and some loss of oxidant during periods of excess generation. The improved control of the process when using bisulphate makes it possible to operate with a smaller excess of nitrite than the 5% now provided to take care of losses in the foam. The product obtained in plant runs is of extremely good color, being white or cream in appearance, has a high melting point, from 170–173° C., and is, of course, quite pure.

*Example 2*

The foregoing process may be carried out as follows: To 300 gallons of city water in a reaction tank is added 81 pounds of 95% sulphuric acid. Into this diluted acid is then run an aqueous solution of sodium mercaptobenzothiazole, free mercaptobenzothiazole being precipitated out by this treatment. The contents of the reaction vessel are agitated while the sodium mercaptobenzothiazole is being added and the resulting slurry is tested from time to time until the test is neutral or slightly acid to litmus. About 250 pounds of the sodium salt are required to reach the point of approximate neutrality. Thereupon, the addition of the sodium salt is stopped and sodium nitrite, in solid form, is placed in the slurry, 110 pounds being added to provide an excess of about 5%.

Next, a dilute solution of sodium bisulphate is added gradually in amount sufficient to decompose the sodium nitrite and about 10% excess. Oxidation proceeds as the bisulphate is added and all of the mercaptan has been converted to di(benzothiazyl) disulphide when the addition of the bisulphate is completed. The product is filtered, washed, dried and then pulverized and sifted. The disulphide was obtained in a yield of 100% with a melting point of 170–172° C. and was white in color, indicating a particularly pure product.

Sodium or potassium bisulphates will readily suggest themselves as suitable for the process but other bisulphates which part readily with their acid may also be used. Also, while it is preferred to combine the advantages of the process using an alkali metal nitrite in amount at least molecularly equivalent to the mercaptothiazole being oxidized with the advantages obtainable by employing bisulphate as the acid substance for decomposition of the nitrite, it is possible to employ the bisulphate in connection with processes of the prior art in which less than the molecular equivalent of nitrite is employed and air is blown in.

It will be understood that other mercaptothiazoles, such as 1-mercapto naphtho thiazole, 1-mercapto 3-phenyl benzothiazole, 1-mercapto 4-nitro benzothiazole, 1-mercapto 5-chlor benzothiazole, 1-mercapto 3-methyl thiazole, 1-mercaptothiazole, 1-mercapto 4-chlor benzothiazole, 1-mercapto 5-nitro benzothiazole, 1-mercapto 5-ethoxy benzothiazole, 1-mercapto 5-hydroxy benzothiazole, and 1-mercapto alkyl benzothiazoles may be treated by the process of the invention, in place of 1-mercaptobenzothiazole, to yield the corresponding disulphides.

Although there has been described above the preferred embodiment of the invention, it will be apparent to those skilled in the art that the invention is not limited thereto but that various modifications may be made therein without departing from the spirit of the invention or from the scope of the appended claims. It is intended, then, that the patent shall cover, by suitable expression in the appended claims, all features of patentable novelty residing in the invention.

What I claim is:

1. A process of preparing a dithiazyl disulphide which comprises preparing a slurry of the corresponding 1-mercaptothiazole, adding to the slurry at least the molecular equivalent of a nitrite capable of yielding nitrogen oxides when treated with an acid substance and then supplying an acid substance to the slurry until the reaction has been completed.

2. A process of preparing a di(aryl thiazyl) disulphide which comprises preparing a non-alkaline slurry of the corresponding 1-mercapto aryl thiazole, adding to the slurry a nitrite capable of yielding nitrogen oxides when treated with an acid substance in amount at least molecularly equivalent to the 1-mercapto aryl thiazole present and then gradually supplying an acid substance until the nitrite has been converted to nitrous acid and nitrogen oxides as the sole oxidizing agent.

3. A process of preparing a di(benzothiazyl) disulphide which comprises preparing an aqueous slurry of the corresponding mercaptobenzothiazole, adding to the slurry a nitrite capable of yielding nitrogen oxides when treated with an acid substance in amount at least molecularly equivalent to the mercaptobenzothiazole and then gradually supplying an acid substance until the nitrite has been converted to nitrous acid and nitrogen oxides.

4. A process of preparing di(benzothiazyl) disulphide which comprises preparing an aqueous slurry of 1-mercaptobenzothiazole, adding to the slurry a nitrite capable of yielding nitrogen oxides when treated with an acid substance in approximately the molecular amount necessary to oxidize the mercapto compound to the disulphide and then gradually supplying an acid substance until the nitrite has been converted to nitrous acid and nitrogen oxides and the mercapto compound has been oxidized to the disulphide.

5. A process of preparing di(benzothiazyl) disulphide which comprises treating an aqueous solution of an alkali metal salt of mercaptobenzothiazole with dilute acid to precipitate the free mercaptan, adding an alkali metal nitrite to the non-alkaline slurry, so formed, in amount molecularly equivalent to the mercaptan, heating to a temperature of about 90° to 95° C., adding dilute mineral acid at a rate such that a small amount of nitric oxide fumes is formed and agitating until the oxidation of the mercaptan is complete.

6. A process of preparing di(benzothiazyl) disulphide which comprises treating an aqueous solution of an alkali metal salt of mercaptobenzothiazole with dilute acid to precipitate the free mercaptan, adding an alkali metal nitrite to the non-alkaline slurry, so formed, in amount molecularly equivalent to the mercaptan, heating to a temperature at about 90° to 95° C., adding dilute alkali metal bisulphate solution gradually in amount sufficient to decompose the alkali metal nitrite and agitating until the oxidation of the mercaptan is complete.

7. A process of preparing di(benzothiazyl) disulphide which comprises treating an aqueous solution of sodium mercaptobenzothiazole with dilute acid to precipitate the free mercaptan, adding sodium nitrite to the non-alkaline slurry so formed in amount at least molecularly equivalent to the mercaptan, maintaining the temperature at about 30° C., adding dilute sulphuric acid at a rate such that a small amount of nitric acid fumes is formed, and agitating until the oxidation of the mercaptan is complete.

8. A process of preparing di(benzothiazyl) disulphide which comprises treating an aqueous solution of sodium mercaptobenzothiazole with dilute acid to precipitate the free mercaptan, adding sodium nitrite to the non-alkaline slurry, so formed, in amount slightly in excess of that equivalent to the mercaptan, maintaining the temperature at about 30° C., adding dilute sodium bisulphate solution gradually in amount sufficient to decompose the sodium nitrite and agitating until the oxidation of the mercaptan is complete.

ALBERT J. GRACIA.